(12) United States Patent
Pendergraft et al.

(10) Patent No.: US 7,110,925 B2
(45) Date of Patent: Sep. 19, 2006

(54) SECURITY CHECKPOINT SIMULATION

(75) Inventors: David Ross Pendergraft, Manassas, VA (US); Ann Raechel Shrader-Brawley, Houston, TX (US); Craig V. Robertson, Denver, CO (US)

(73) Assignee: Accenture Global Services GmbH, Schaffhausen (CH)

( * ) Notice: Subject to any disclaimer, the term of this patent is extended or adjusted under 35 U.S.C. 154(b) by 716 days.

(21) Appl. No.: 10/293,469

(22) Filed: Nov. 14, 2002

(65) Prior Publication Data

US 2004/0098237 A1    May 20, 2004

(51) Int. Cl.
*G06G 7/48* (2006.01)

(52) U.S. Cl. .................. 703/6; 378/57; 235/385; 382/100

(58) Field of Classification Search .......... 378/86, 378/88, 57; 705/5, 6, 8; 342/179, 27; 340/506, 340/541, 10.42; 250/286; 700/213; 382/100; 244/114 R; 701/207; 235/385
See application file for complete search history.

(56) References Cited

U.S. PATENT DOCUMENTS

| | | | | |
|---|---|---|---|---|
| 5,109,691 | A * | 5/1992 | Corrigan et al. | 73/23.36 |
| 5,692,029 | A * | 11/1997 | Husseiny et al. | 378/88 |
| 2002/0176531 | A1 * | 11/2002 | McClelland et al. | 378/57 |
| 2002/0176532 | A1 * | 11/2002 | McClelland et al. | 378/57 |
| 2002/0186862 | A1 * | 12/2002 | McClelland et al. | 382/100 |
| 2003/0061080 | A1 * | 3/2003 | Ross | 705/6 |
| 2003/0122685 | A1 * | 7/2003 | Tuttle | 340/825.49 |
| 2003/0141411 | A1 * | 7/2003 | Pandya et al. | 244/114 R |
| 2003/0196097 | A1 * | 10/2003 | Korosec et al. | 713/185 |
| 2003/0210139 | A1 * | 11/2003 | Brooks et al. | 340/531 |
| 2004/0035928 | A1 * | 2/2004 | Anderson | 235/385 |
| 2005/0008119 | A1 * | 1/2005 | McClelland et al. | 378/57 |
| 2005/0031076 | A1 * | 2/2005 | McClelland et al. | 378/57 |
| 2005/0065834 | A1 * | 3/2005 | Hale et al. | 705/8 |
| 2005/0093733 | A1 * | 5/2005 | Lovberg et al. | 342/22 |
| 2005/0128304 | A1 * | 6/2005 | Manasseh et al. | 348/207.99 |
| 2005/0154527 | A1 * | 7/2005 | Ulrich | 701/207 |
| 2005/0159838 | A1 * | 7/2005 | Quackenbush et al. | 700/213 |

OTHER PUBLICATIONS

K. Leone, *Security System Throughput Modeling*, Proceedings 36th Annual 2002 International Carnahan Conference on Security Technology, Oct. 20. 2002, vol. Conf. 36, p. 146.

P. E. Joustra, *Simulation of Check-in At Airports*, Proceedings of the 2001 Winter Simulation Conference, Dec. 9, 2001, vol. 1 of 2, Conf. 34, pp. 1023-1028.

* cited by examiner

*Primary Examiner*—Kamini Shah
*Assistant Examiner*—Cuong Van Luu
(74) *Attorney, Agent, or Firm*—Hogan & Hartson LLP

(57) ABSTRACT

The present invention provides a system and method for simulating a security checkpoint. While the present invention is presented in the context of an airport, the simulation may be easily adapted for any type of security checkpoint at any location. Specifically, the present invention provides a model that evaluates the time costs of security measures related to checking-in baggage, screening passengers, and screening the passengers' carry-ons. The model is robust to allow changes in security configurations, schemes, devices, and personnel. In one embodiment, the present invention further includes a security demand model.

19 Claims, 14 Drawing Sheets

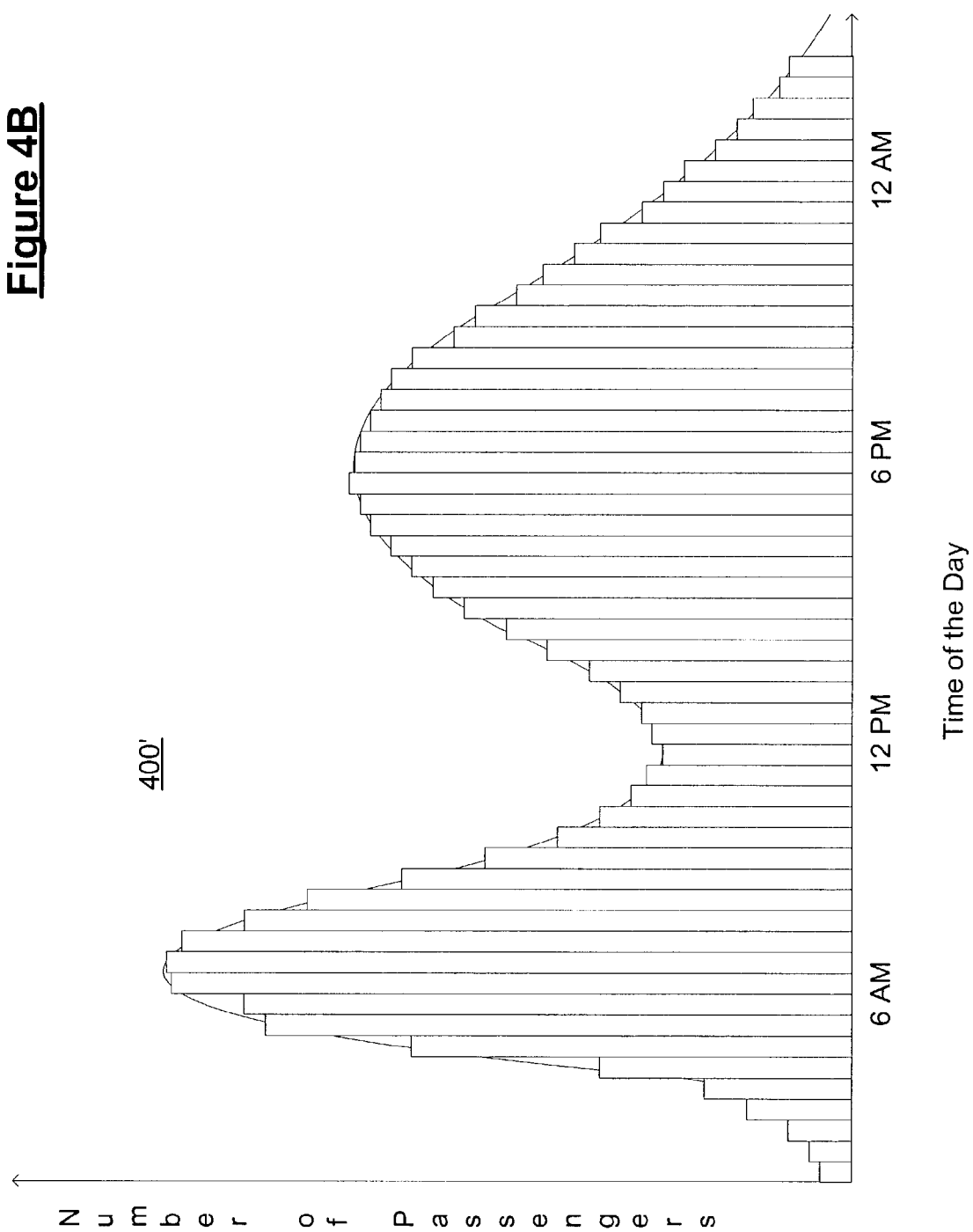

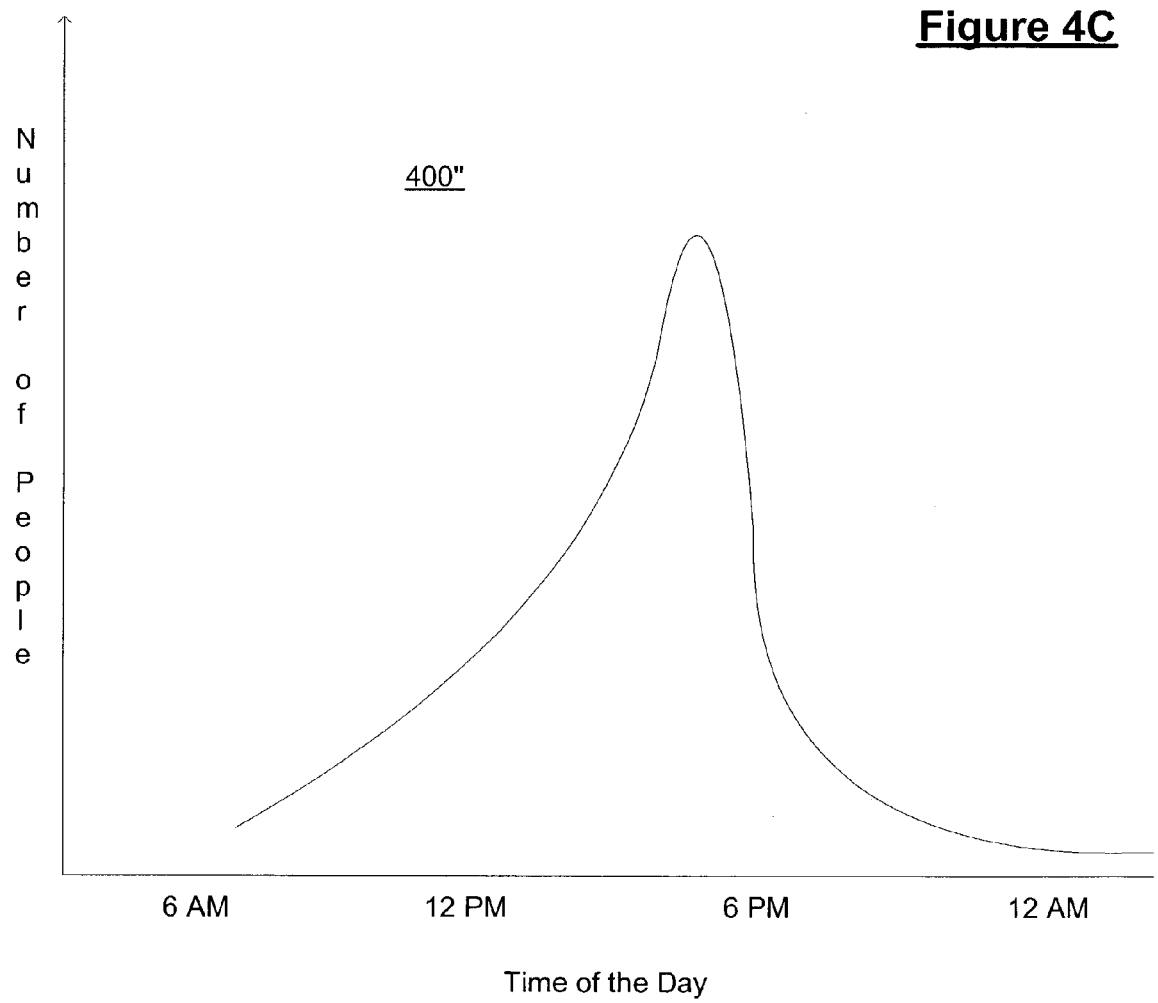

SECURITY CHECKPOINT SIMULATION

FIELD OF THE INVENTION

The present invention relates to a model for replicating the balance between customer experience, resource requirements, and process performance associated with security measures. Specifically, the present invention provides a model for evaluating the impact of various security configurations on checkpoint operations.

BACKGROUND OF THE INVENTION

Security measures allow the public to continue to live normally in an increasingly dangerous world. Because of the increasing dangers, security precautions are becoming standard aspects of modern life. The cost to the public for increased security includes the inconvenience of time delays, but the time costs for security measures are not readily apparent. Therefore, there exists a current need for a model to measure the level of this inconvenience.

In assessing the desirability of new or altered security measures, policy makers generally balance greater security with increases in inconvenience. However, it is often difficult for policy makers to assess the effectiveness of new security measures and the inconvenience caused by additional security measures. Furthermore, the inconvenience costs of additional security measures may be partially mitigated by factors that are generally difficult to evaluate, such as an improved checkpoint design or increasing the number of security devices and security employees. Thus, there is a further need for a robust model of security checkpoints that allows policy makers to assess new security measures and new configurations of existing security measures.

SUMMARY OF THE INVENTION

In response to these and other needs, the present invention provides a model for evaluating the impact of one or more security measures on the customer experience. Specifically, the present invention provides a model that evaluates the time costs of security measures related to the screening of people and their belongings. The model is robust to allow changes in security configurations, schemes, devices, and personnel. In a preferred implementation, the model of the present invention further links interrelated steps in the screening of people and their personal effects.

In another embodiment, the present invention includes a security checkpoint simulation that uses the security checkpoint model. The security checkpoint simulation, with an associated animation, is a computer-based simulation of the complex security checkpoint process. The simulation addresses customer experience (such as wait time, overall processing time, etc.) based on checkpoint demand, alarm rates, activity service times, scheduled resources, and security policies. The simulation is used to determine the equipment and staff required to meet a specified service level. The simulation may also be used in the optimized scheduling process for any security checkpoint.

The checkpoint simulation may be used to determine the equipment and staff required to maintain a specific service level for any security checkpoints. This may include any airport around the globe, federal building checkpoints or large event checkpoints such as concerts, sporting events, etc. The simulation may also be used in the optimized scheduling of resources for those checkpoints.

In one embodiment, the present invention further includes a security demand model. Specifically, the present invention may enable simulations that consider varying levels of people at a security checkpoint and the effects of these varying levels of people on customer experience, resource requirements, and process performance associated with security measures.

In a preferred embodiment, the model of the present invention is applied in the context of security checkpoints in an airport. The present invention is thereby configured to simulate security checkpoints in an airport for screening passengers and their carry-ons.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIGS. 4A–4C are graphs of security checkpoint demand in accordance with an embodiment of the present invention;

DETAILED DESCRIPTION OF THE PREFERRED EMBODIMENT

Figure 1:
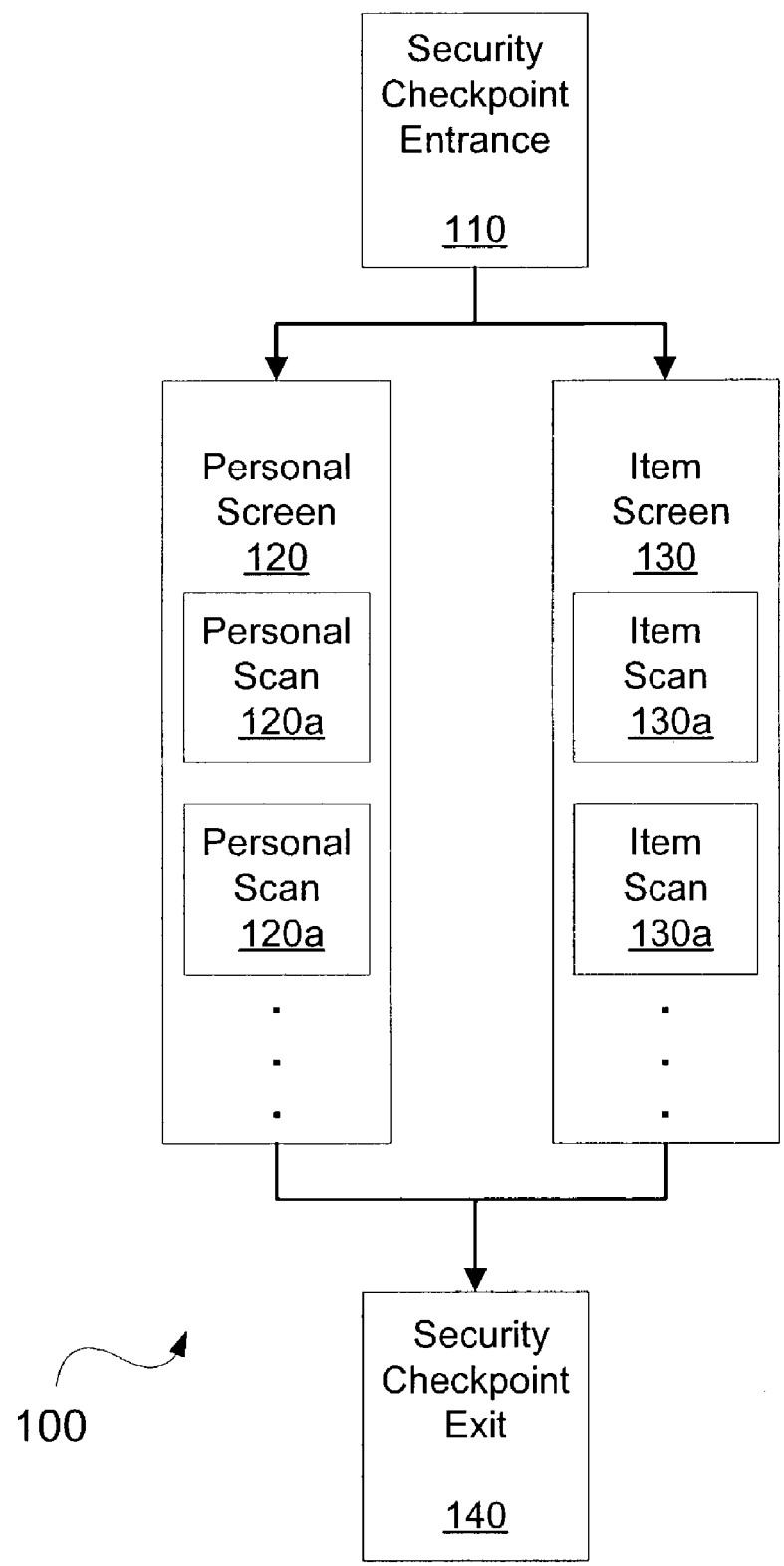
FIG. 1 is a schematic diagram of a security checkpoint.

FIG. 1 schematically depicts a typical security checkpoint 100. Generally, a person enters the security checkpoint entrance 110 and removes personal items. The person and her items are then screened separately in a personal screen area and an item screen area, respectively 120 and 130. The personal screen area 120 generally includes one or more personal scans 120a. Likewise, the item screen area 130 generally includes one or more item scans 130a. After the person passes through the personal screen area 120 and the items are screened in the item screen area 130, the person recovers her items at the security checkpoint exit 140 and leaves the security checkpoint 100. Obviously, the actual physical layout of the security checkpoint 100, the personal scans 120a, and the item scans 130a may vary greatly, as needed.

Figure 2A:
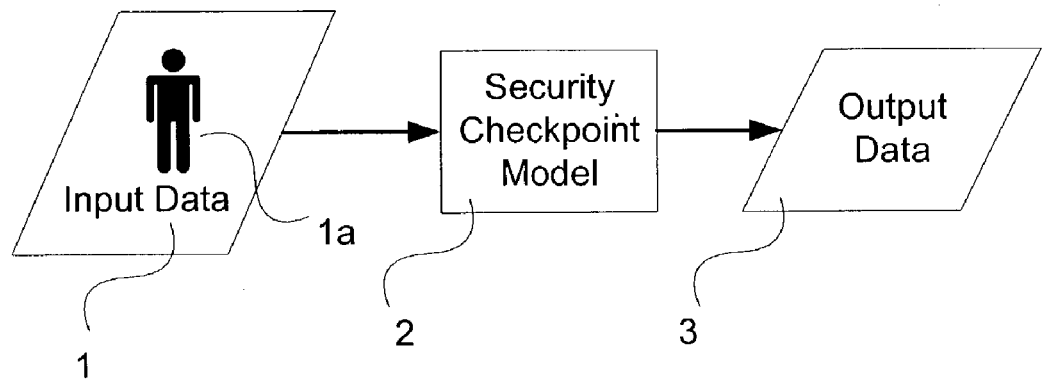
FIG. 2A (PRIOR ART) is a schematic diagram of a known security checkpoint model.

Security checkpoints have been modeled and simulated previously, as depicted in FIG. 2A (PRIOR ART), using a security checkpoint model 2 that receives input data 1 and produces output data 3. The input data 1 generally corresponds to the number of people 1a entering the security checkpoint. The output value 3 generally includes measurements of customer experience (such as wait time, processing time, queue length, etc.) based on checkpoint demand, alarm rates, processing times, scheduled resources, and security policies.

In the prior art, the security checkpoint model 2 functions as a black-box having a set of possible output values and some type of rule for selecting from the set of possible output values. For example, output data 3 may include customer wait time in the security checkpoint, where the process or service time for security checkpoint model 2 may be bounded by a minimum and a maximum time, such as 10 and 100 seconds. A value between 10 and 100 seconds is then assigned as the process time for each simulated person. The particular process, service or activity value for each simulated person may be randomly assigned according to a statistical distribution, such as uniform, normal, Poisson distributions, etc. The particular values and distribution used in the black-box-style security checkpoint model 2 may be selected as necessary to conform to an actual security checkpoint. For instance, the actual process times at a security checkpoint measured to determine minimum and maximum values and the distribution of process times between these values. The customary wait time is then a function of the process time and number of resources in checkpoint mode 12.

In this way, the prior art security checkpoint model 2 aggregates together the individual tasks and processes occurring in the security checkpoint to determine output values. While the prior art security checkpoint model 2 illustrated in FIG. 2A is able to simulate an existing security checkpoint, this type of model has a limited ability to predict the effects of changes in the individual tasks and processes occurring in the checkpoint. While someone may attempt to use the black-box model 2 to predict the effects of changes by varying the output value ranges or the distribution of the values, the predictive accuracy of the black-box model 2 is generally poor. In particular, the effects of changes in one or more of the individual tasks and processes occurring in the security checkpoint are not easily represented through the black-box model 2 because these the individual tasks and processes are not separately replicated.

Figure 2B:
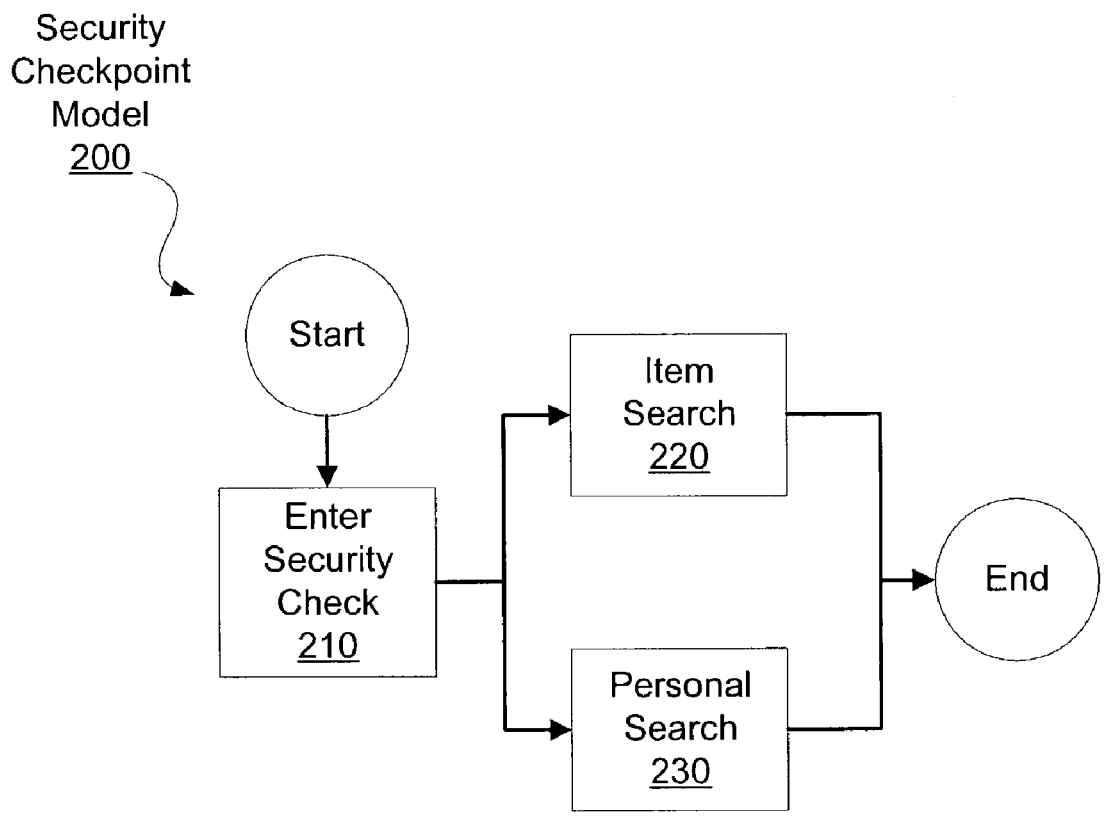
FIGS. 2B–2H are flowcharts depicting security checkpoint model in accordance with embodiments of the present invention.

Turning now to FIG. 2B, the present invention provides a security checkpoint model 200 having at two or more processes such as entering the security checkpoint in step 210, screening items in step 220, and screening people in step 230. As visually evident, the security checkpoint model is quite similar to the schematic illustration of an actual security checkpoint in FIG. 1. Each of the steps 210, 220, and 230 may be separately simulated to produce output values as described above in the text accompanying FIG. 2A. Thus, each of the steps 210, 220, and 230 may be separately modeled black-boxes. For instance, a user may define rules for simulating output values for each of the steps 210, 220, and 230. To model changes in the checkpoint, the values or distribution for steps 210, 220, or 230 may be adjusted. The adjustment of the values and the distribution is described in greater detail below in FIG. 3 and the accompanying text. By adjusting values for separate steps, the passenger checkpoint model 200 of the present invention more accurately approximates changes in a passenger checkpoint.

As depicted in FIGS. 2C–2F, one or more of the steps 210, 220, and 230 may be further decomposed into one or more separate substeps. Then, each of the substeps of steps 210, 220, and 230 may be a separately modeled processes having user-defined rules for simulating output values, which are aggregated to produce total output values for steps 210, 220, and 230.

Figure 2C:
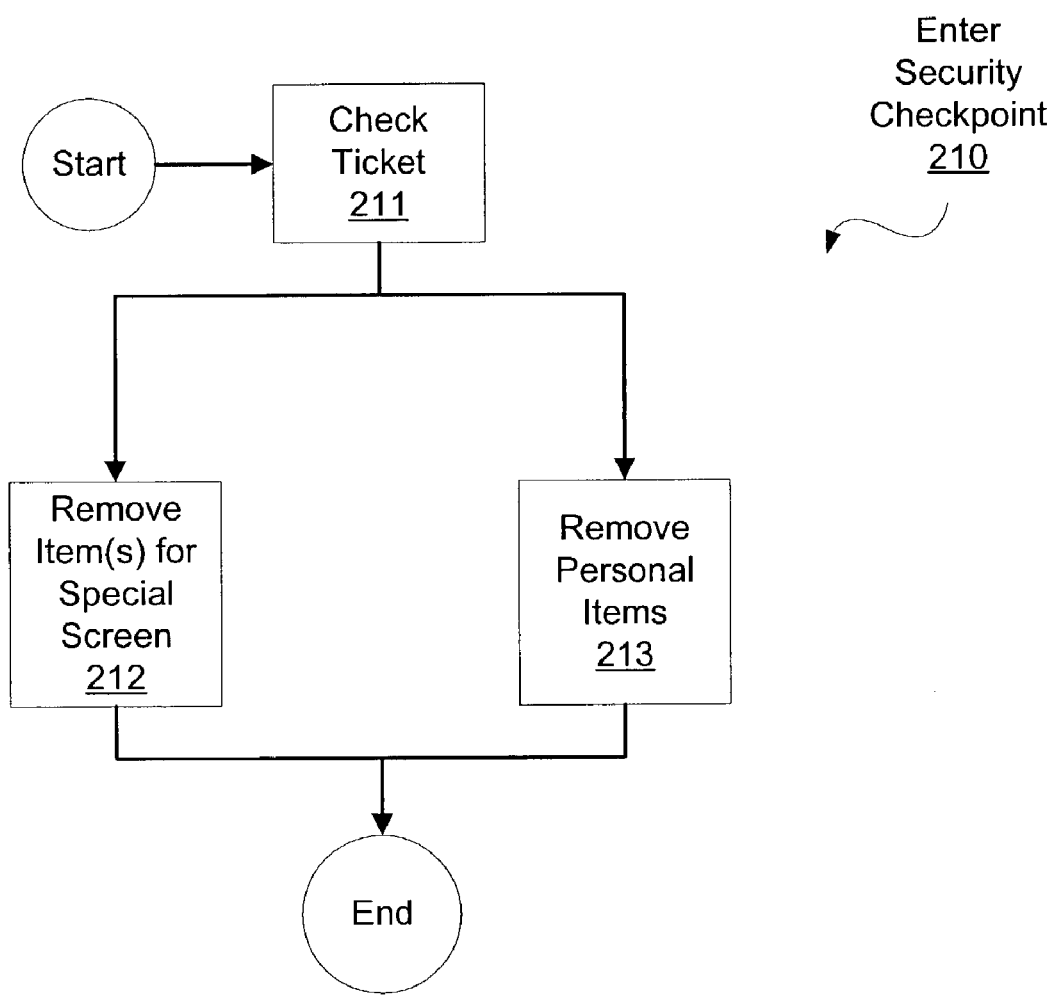

Turning now to FIG. 2C, separate tasks related to entering the security checkpoint in step 210 are depicted. In some instances, only people having a ticket are allowed to enter the security checkpoint. For example, only passengers may enter an airport security checkpoint, and only ticket-holders may pass a security checkpoint for many large public events. Thus, one task for entering the checkpoint in step 210 is to check the person's ticket, step 211.

Before entering the security checkpoint, the person further determines whether she is carrying a special item that requires a separate search. If the person has any special items, such a laptop computer or camera equipment, the passenger removes this item for item screening, step 212. The person similarly determines whether she is carrying any particular personal items to be removed prior to entering the security checkpoint and removes these items for item screening, step 213. Generally, the passenger removes items such as keys, coins, jewelry, cell phones, etc. that may interfere with the security screens performed in the security checkpoint. The items removed by the person in steps 212 and 213 are generally screened in the security checkpoint using the item screening procedure described below in step 220.

As depicted in FIG. 2B, the screening of the person's items in step 220 and screening of the person in step 230 occur concurrently to expedite the security process. However, as described in greater detail below, item screening in step 220 and personal screening in step 230 may be inter-related so that tasks in one of the steps cannot begin until the completion of a task in the other step. The screening of the person's items in step 220 and screening of the person in step 230 are described in greater detail in FIGS. 2D–2F.

Figure 2D:
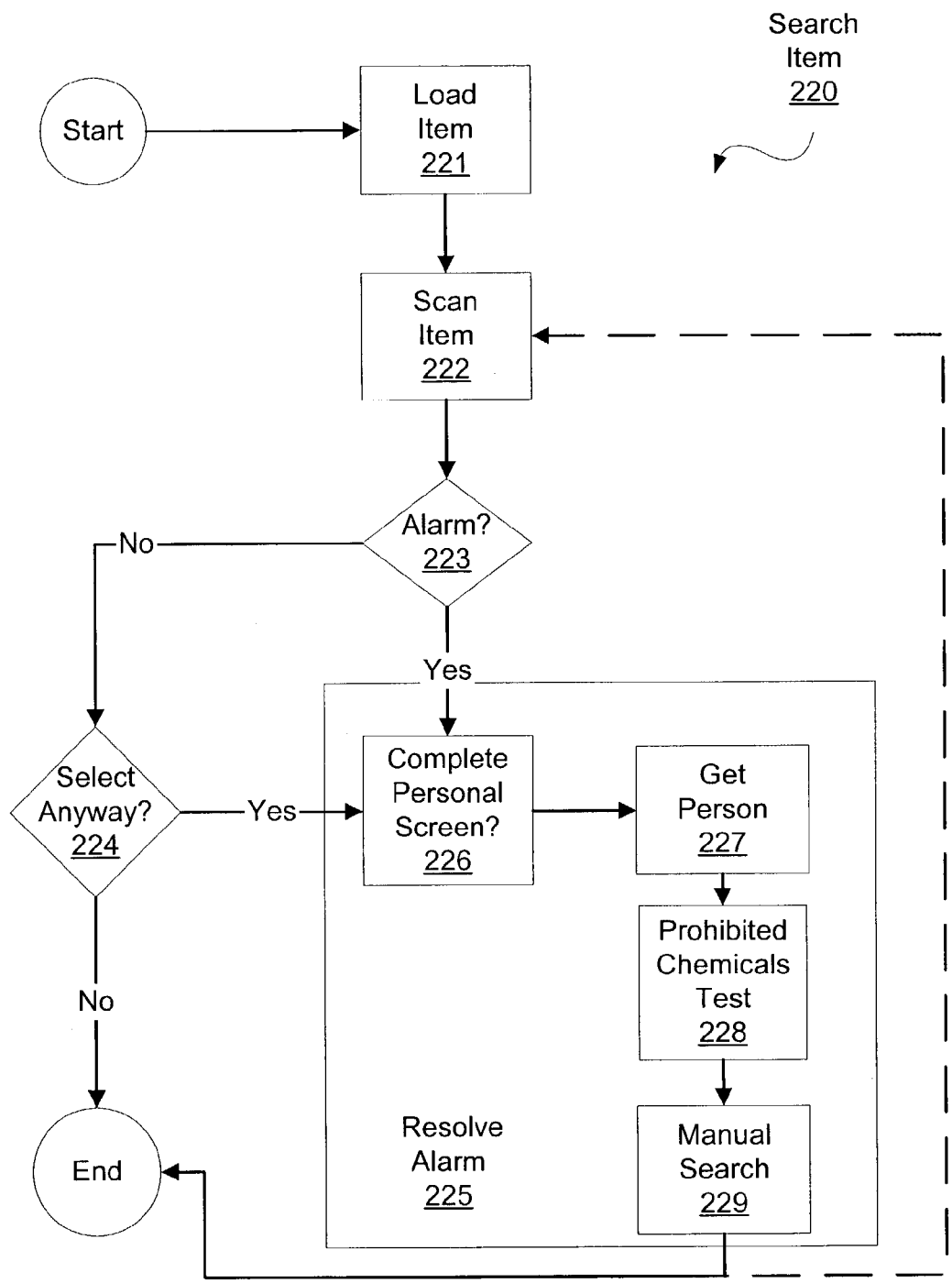

Turning now to FIG. 2D, a person may initiate the item screening in step 220 by loading the item into a scanning device, step 221. The item is then scanned in step 222 using known technology. Typically, the item scanning in step 222 uses some type of x-ray device that allows security officials to see into the item. The person's items removed in steps 212 and 213 may be searched using a similar procedure. The scanning device (or the personnel manning the device) may produce an alarm in condition 223. If an alarm is produced, then the alarm must be resolved in step 225 through detailed screening before that item is allowed through the security checkpoint. Also, even if an alarm is not produced, the item may be more thoroughly screened anyway, condition 224. For instance, a certain percentage of items may be randomly selected for detailed screening using the procedures in step 225.

When resolving an alarm in step 225, security officials generally locate the person who owns the item, step 227, so that the person may view any examination of her item. Thus, prior to resolving an alarm in step 225, the personal screen of step 230 (described below) must first be completed, step 226. Generally, the outputs from the waiting for the completion of the personal screening in step 226 is not separately modeled but rather taken from the aggregate output of step 230. In this way, the personal screening in step 230 affects the item screening in step 220. Therefore, a preferred embodiment of the checkpoint security model 200 includes the interrelationships of item screening in step 220 and the personal screening in step 230. In another embodiment, a maximum wait-time may be established for the completion of the personal screening in step 226. This maximum time delay corresponds to a real-world scenario in which an item is removed from the item screening process 220 after a certain period to free the item screening resources.

It should be appreciated that other modeled tasks in the checkpoint security model 200 may be similarly linked as well. For instance, the same security official may perform two types of screening (e.g., the manual item search 229 and the shoe inspection 236), so that one screening may not initiate until the completion of the other screening.

The resolving of the alarm in step 225 generally entails a more thorough examination of the item as necessary for the security checkpoint of interest. For instance, in an airport, security officials may test the item for presence of prohibited chemicals, step 228. If needed, the security officials may next manually search the item, step 229, to identify the cause for the alarm. It should be appreciated that other security tasks or combinations of tasks may be incorporated into the detailed screening in step 225.

Figure 2E:
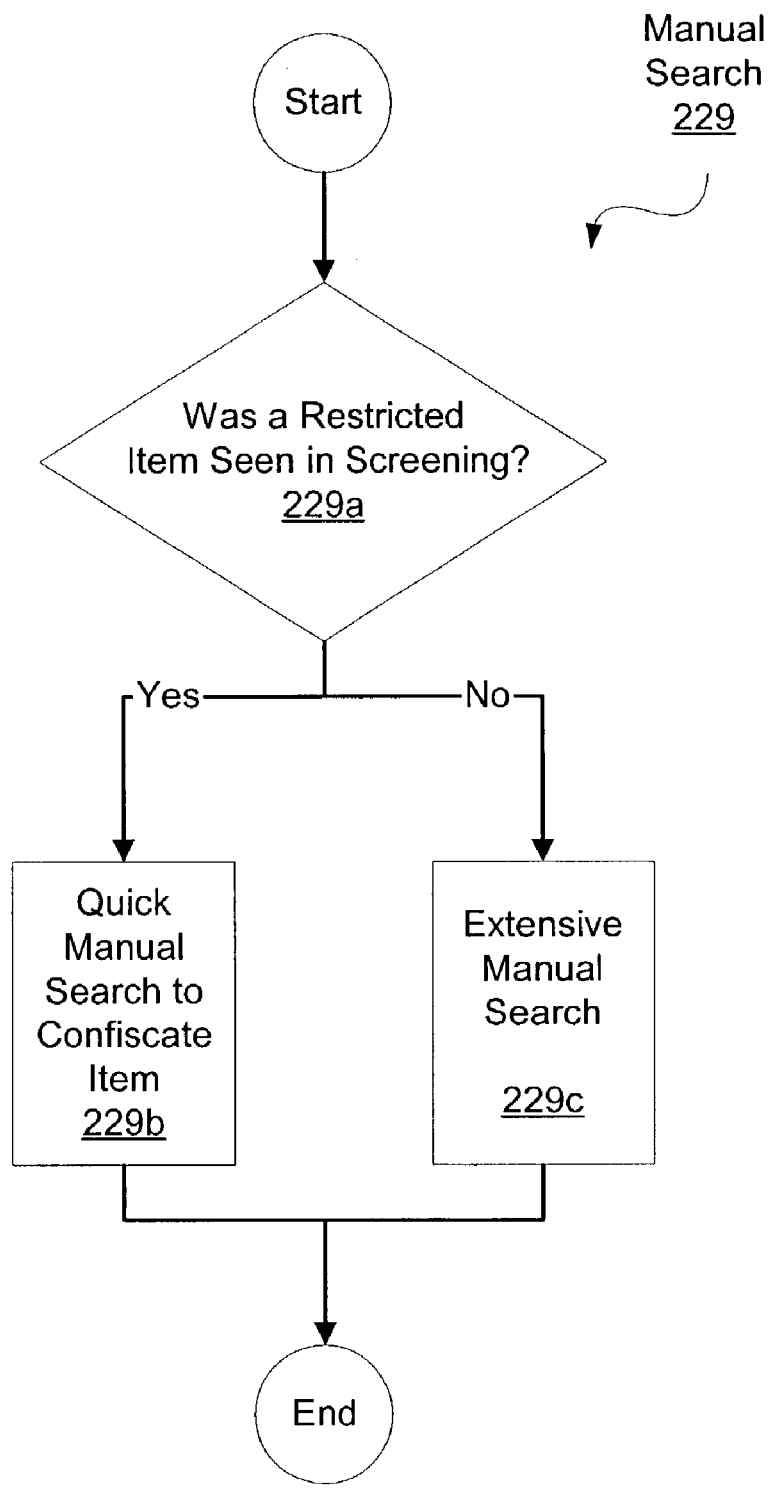

The manual search in step 229 may vary according to the results of the scanning in step 222, as illustrated in FIG. 2E. Specifically, the manual search may vary depending on whether a restricted item was seen during scanning, condition 229a. Restricted items may be objects such as pocket knives, nail files, and tweezers that people may not generally bring past the security checkpoint. When a restricted item was seen during the scan in step 222, security officials may do a quick manual search to locate and confiscate that restricted item, step 229b. However, if the scanning in step 222 did not identify a restricted item, then the security officials do an extensive manual search in order to identify the cause for the scanning alarm, step 229c.

Returning FIG. 2D, after the item screening alarm is resolved in step 225, the item may be cleared and the item screening ends. Alternatively the item may be re-scanned in step 222.

Figure 2F:
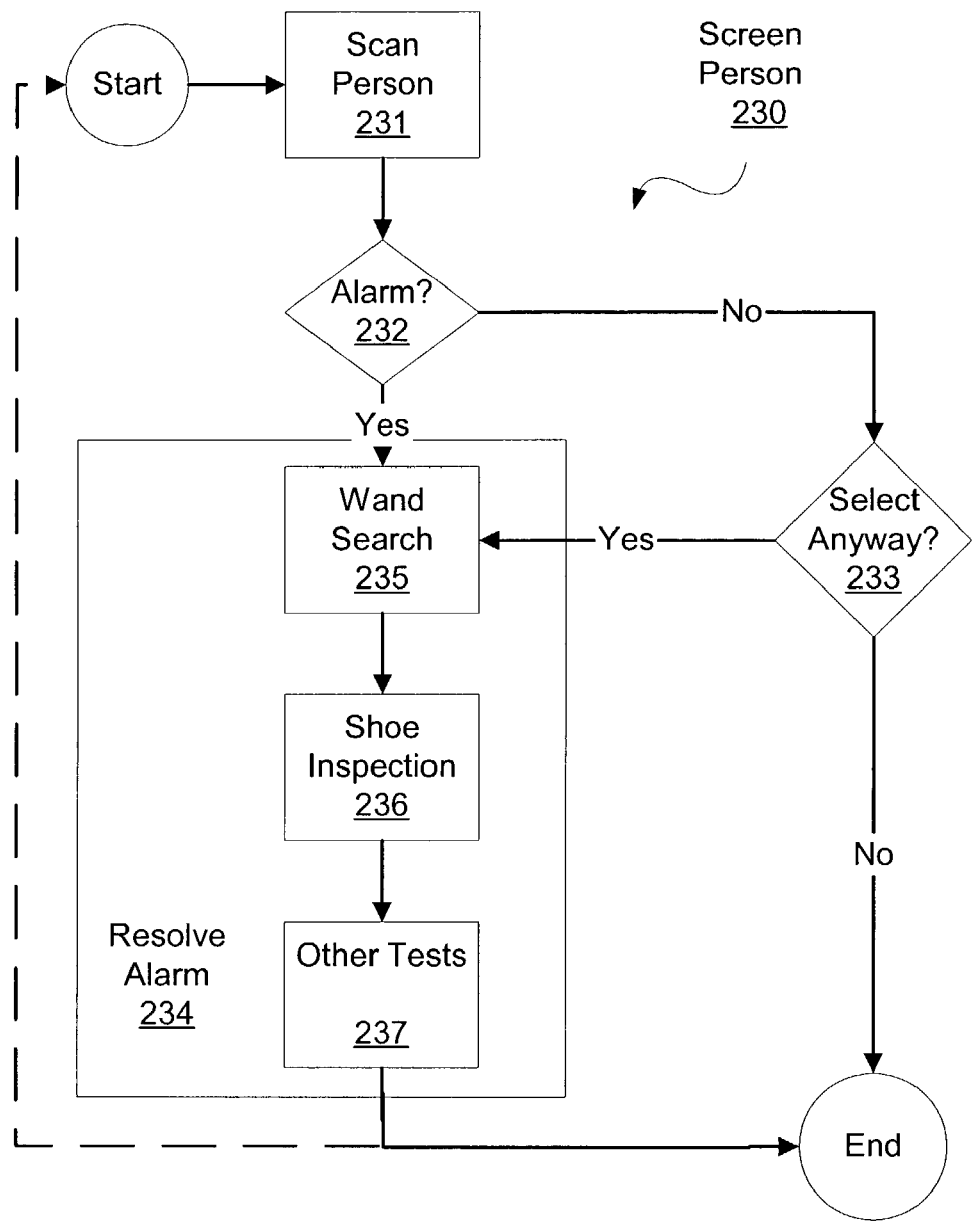

Turning now to FIG. 2F, a person entering the security checkpoint is screened in step 230. The personal search begins with a scan of the person, step 231. The scanning of the person in step 231 is generally done by some type of rapid testing device, such as a walk through metal detector. A certain percentage of the people will activate an alarm, condition 232, thereby requiring resolution of the alarm in step 234. Increasing the sensitivity of the personal scanning device may be simulated by increasing the percentage of people that activate the alarm in step 232. Also, a certain percentage people may be randomly selected for more extensive searching in step 234.

Step 234 comprises more extensive searches, as needed to resolve an alarm from the personal scan. As with the item screening of step 220, the resolving of the alarm in step 234 may vary depending on the security checkpoint of interest. For instance, in an airport, the alarm may be resolved through the combination of a hand held metal detector (HHMD) search, step 235; a shoe inspection, step 236; and any other tests, step 237. These tests, steps 235–237, are meant to identify the cause for the alarm in condition 232. In the HHMD search of step 235, a security official uses a HHMD to identify objects causing the alarm. A security official may also manually inspect a passenger's shoes, step 236. Other security tests (e.g., a frisk) may also be performed, as necessary, in step 237.

In another embodiment of the present invention, the checkpoint security model 200 may further include simulated processes corresponding to actions occurring before and after the security checkpoint. The actions that occur before and after the security checkpoint, while not directly contributing to the output values for the security checkpoint simulation, may otherwise affect the simulation.

Figure 2G:
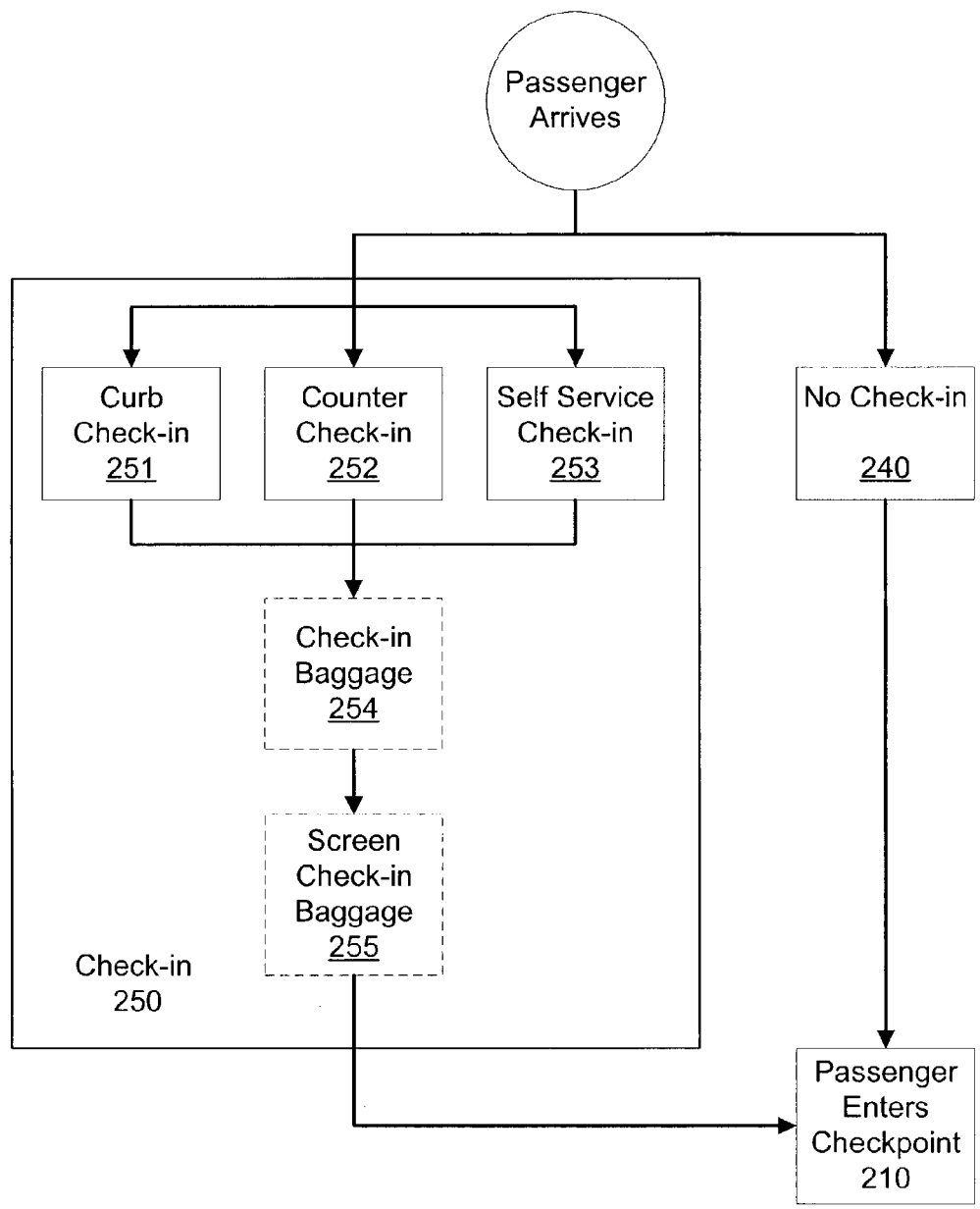

Turning now to FIG. 2G, the security checkpoint model 200 may be adapted to consider processes occurring in an airport before a passenger enters a security checkpoint. Typically, a passenger may check-in, step 250. For instance, certain percentages of passengers check-in at one of various check-in locations, such as curb check-in 251, counter check-in 252, or self-serve check-in 253. These percentages are predetermined and may be selected as needed. If one of the check-in locations is not present in an airport of interest, its associated usage percentage may be set to zero. The output values for check-in at the locations in step 251–253 may vary by location and number of bags checked, if any. Alternatively, passengers may also choose to not check-in, step 240, and, instead proceed directly to the security checkpoint.

During the check-in process in step 250, the passenger may also check-in baggage in step 254. A certain percentage of the baggage may then be screened in step 255. For instance, baggage may be screened using an Explosive Detection System (EDS). The EDS tests baggage for explosives by scanning the internal contents of baggage placed in the EDS. The percentage of the bags searched in step 255 is predetermined and may be defined as specified above. If there is no desire to simulate the EDS or other methods of screening checked-in baggage, the percentage passenger affected by step 255 may be set to zero. Similarly, if the airport safety rules change to require screening of all baggage, the percentage may be increased to unity, or 100%.

Figure 2H:
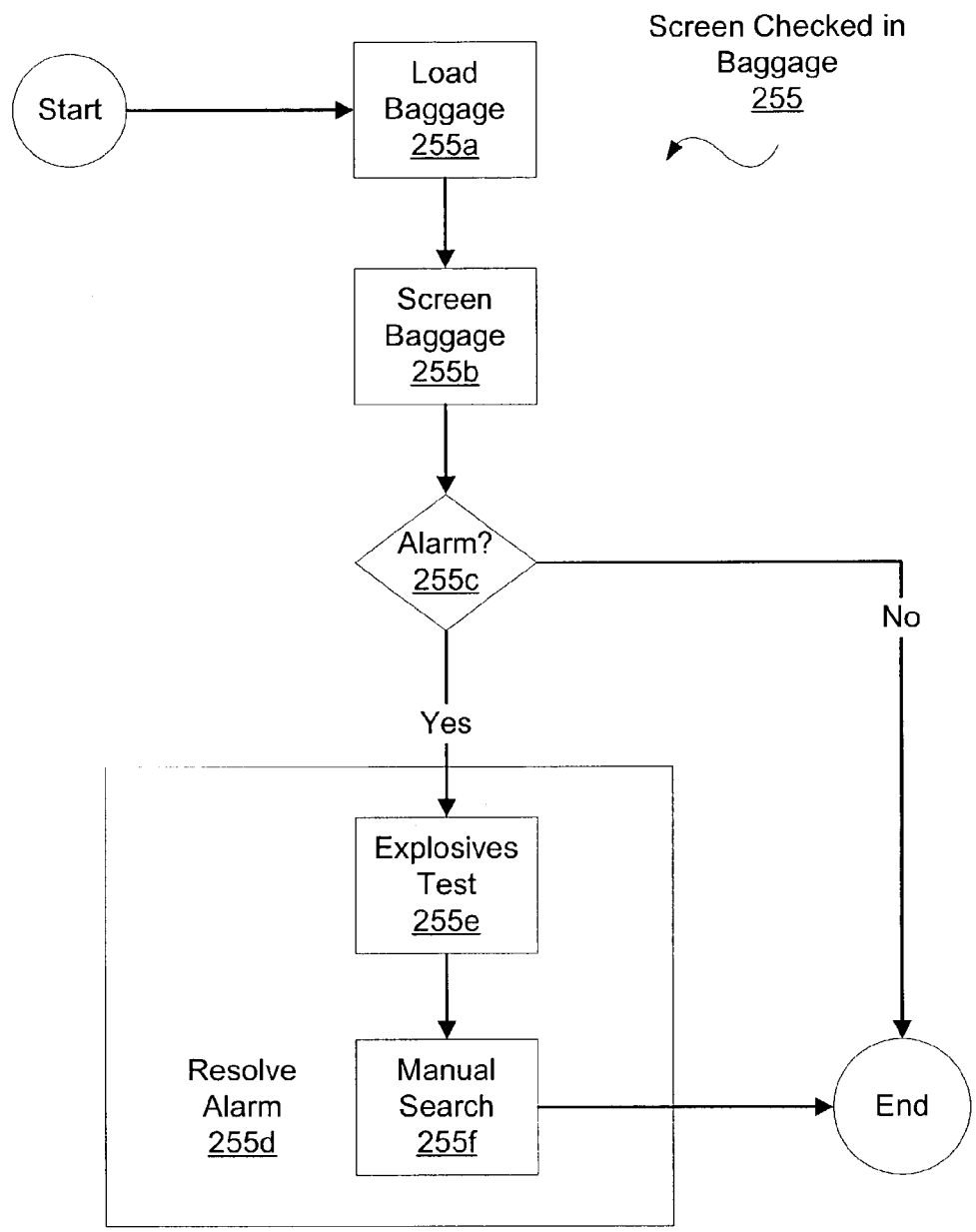

The substeps in the baggage screening in step 255 are depicted in FIG. 2H. In particular, the baggage is loaded into the baggage screening device in step 255a, and the EDS checks the baggage, step 255b. The next step depends on whether the baggage screening device sounds an alarm, condition 255c. If the baggage screening device or personnel manning the device sounds an alarm, the alarm is resolved in step 255d before the baggage is cleared for transport. Typically, the baggage is searched for explosives in step 255e and searched by hand, step 255f.

Figure 3:
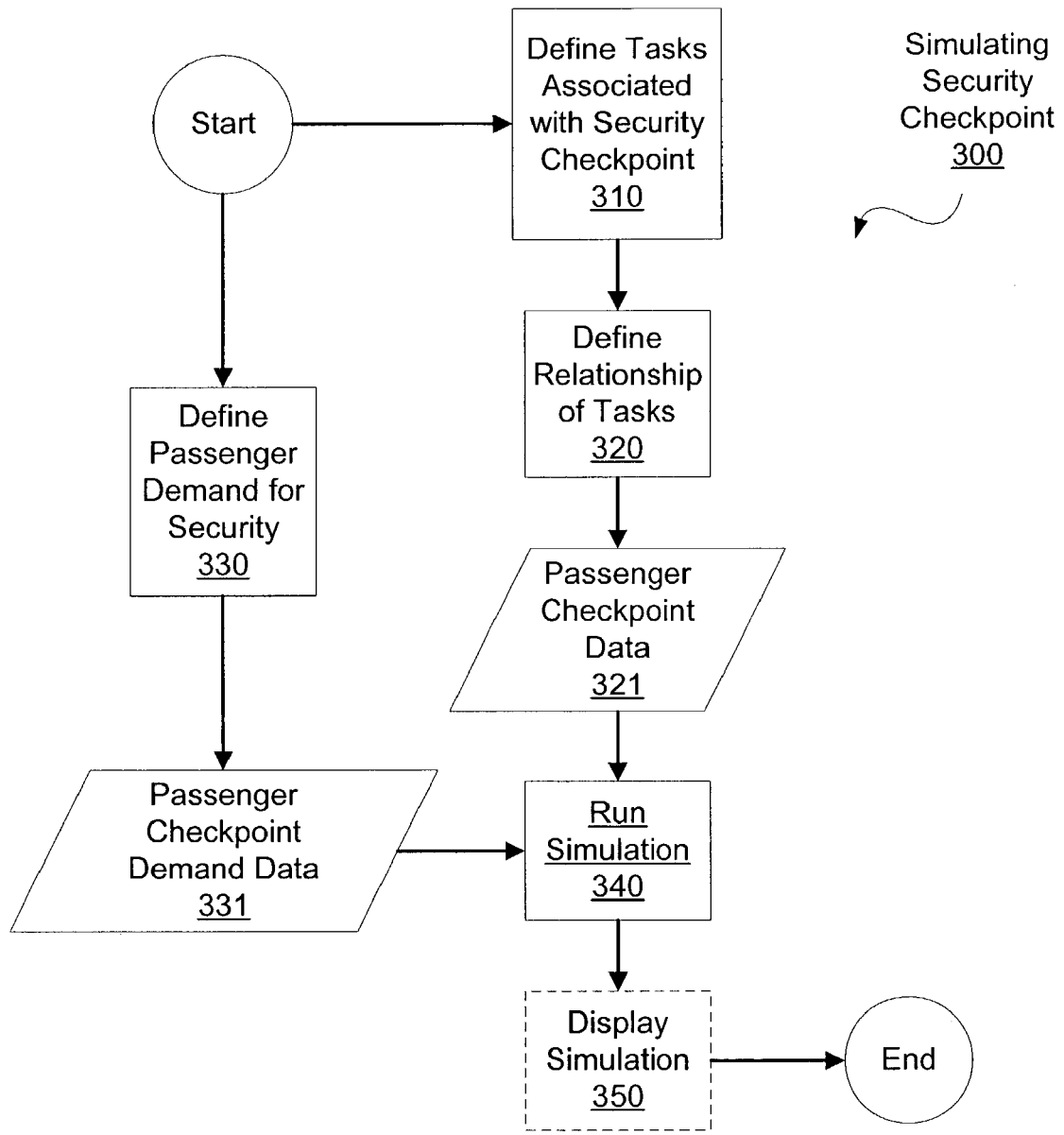
FIG. 3 is a flowchart that depicts the steps in a method for simulating security checkpoints in accordance with an embodiment of the present invention.

In another embodiment, the present invention may further provide a method 300 for simulating one or more security checkpoints, as depicted in FIG. 3. In step 310, one or more task representing potentially time-consuming activities in the security checkpoint are defined. For instance, each task in a checkpoint model may be modeled as described in FIG. 2A. Specifically, each task may have some type of associated output time value representing the delay caused by undertaking that task. The time delay value may be a static value that is empirically determined through testing or surveys. Alternatively, time delays associated with specific security tasks may be dynamically determined by a pre-specified formula or distribution. For example, the time associated with performing a specific security task may be varied between a minimum time and maximum time.

The delay value for a task may be altered as necessary to represent changes in the tasks, as described in greater detail below. For example, the delay value may be changed to represent the varying of machinery or personnel used in security task. Generally, the workforce employed at a security checkpoint may fluctuate throughout the day and impact the queue lengths and wait times. In another example, the delay value may be dynamically linked to other checkpoint conditions, such as the number of customers in a queue. In this way, the psychological effect of "busy" versus "non-busy" time periods may be modeled.

The security tasks have a defined capacity. For example, if two people simultaneously demand a security task, then the task is performed on one person while the second waits for the task to finish with the first person. Generally, the checkpoint model considers the number of resources required to perform tasks and the impact those requirements have on the waiting time of people in the queue when calculating the total delay time for the security checkpoint.

The task variables in step 310 may further include data that affects other, subsequent tasks. In this way, the delay time value associated with a task may be conditionally determined by the results of a previous task. For example, a positive search result during a first task may result in a more thorough search during subsequent tasks. Conversely, a thorough search during a previous task may result in expedited searches during later tasks. Also, the data from one task may be used as a factor in a formula dynamically determining the time delay value for another task. For example, increasing the number of employees required to perform one task to expedite that task may slow the performance of another task.

Returning to FIG. 3, the next action in method 300, step 320, is defining the relationship of the tasks defined in step 310. In essence, the various tasks undertaken during the security checkpoint are organized in step 320 to represent the actual sequence of the tasks. For instance, the security tasks may be organized in that the completion of a first task leads to the undertaking of a second task (sequential task)or so that the first or second task are undertaken concurrently (parallel tasks).

Where a sequential task may lead to one or more next tasks performed, step 320 may further include defining conditions determining which of the next tasks to perform. These conditions may be determined by data from earlier tasks. For example, as described above, a positive search result during a first task may result in a more thorough search during subsequent tasks. Alternatively, the selection of the alternative tasks in a simulation may be randomly chosen according to pre-specified percentages; e.g., one security task is performed on certain percentage (X) of people and an alternative security task is performed on the remaining percentage (1-X) of people.

Overall, the information in steps 330 and 320 is combined to form security checkpoint data 321, which is used in the security checkpoint simulation in step 340. An exemplary security checkpoint model 200 is depicted in FIGS. 2B–2H.

In one embodiment, as depicted in FIG. 3, another step in method 300 is to define security demand for the security, step 330. The security demand may be determined empirically by studying and measuring the number of people at a security checkpoint during the day. Demand information may be simulated using various data and dynamically formed using the measured behavior of people at the particular location. For instance, the demand model may look to the number of departing flights leaving an airport and the average number of passengers on each of those flights. The demand model may further look to behavior of people at a location to determine when those people tend to arrive at the security checkpoint, such as when passengers arrive before a flight. In this way, the demand projection may be dynamically adjusted, such as to reflect changes in the number of flights and the flight times.

Figure 4A:
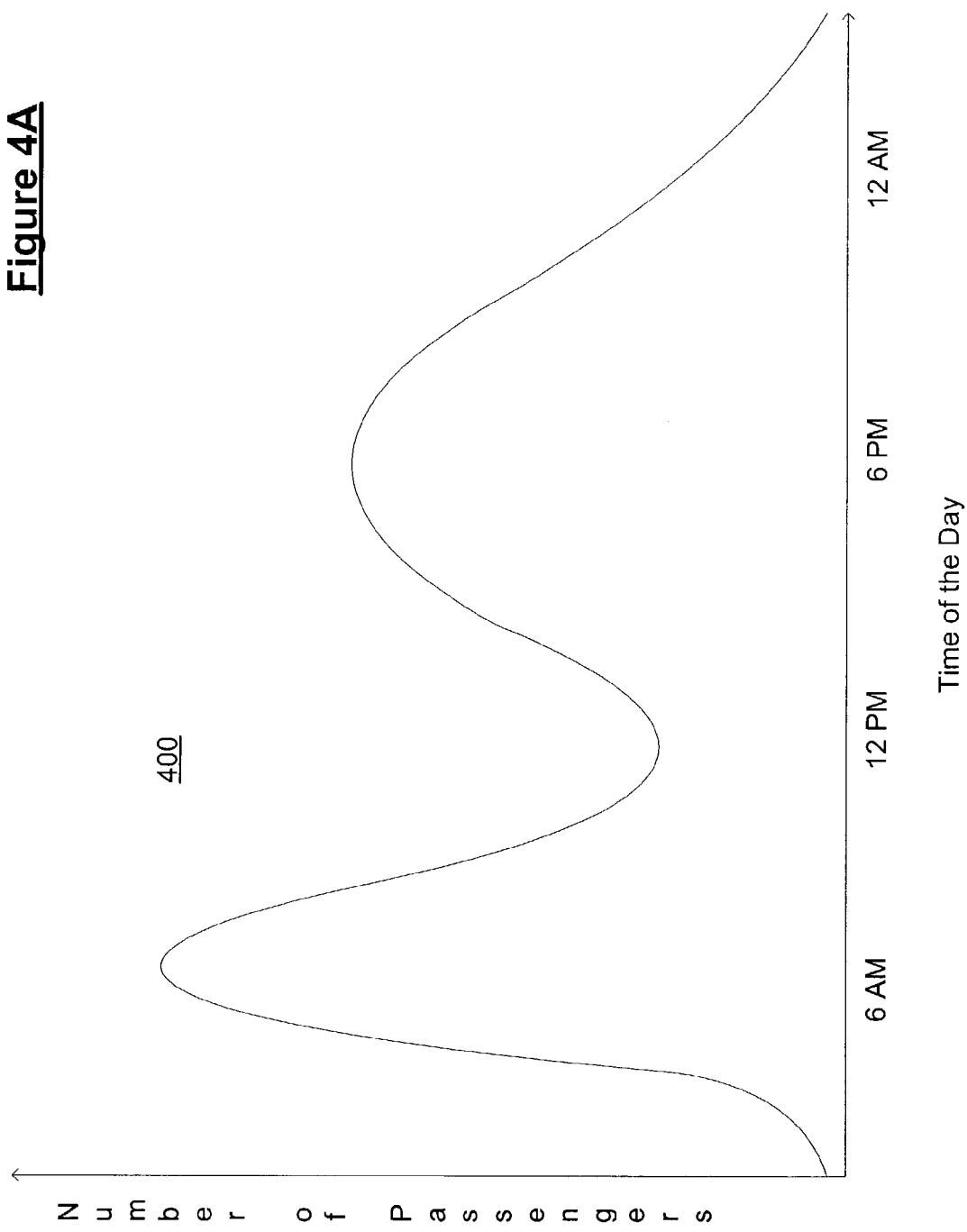

Regardless of the method used for security checkpoint demand, the security checkpoint demand data 331 may then be used in the security checkpoint simulation in step 340. A security demand that varies during the day is more accurate and represents the different number of people at the checkpoint at different times. In this way, the simulation can consider the resulting delays suffered by people during peak periods of use. Exemplary security demand curves are depicted in FIGS. 4A–4C and is discussed in the accompanying text.

A security checkpoint simulation is run in step 340 using the security checkpoint data 321 and the security checkpoint demand data 331. A simulation may be performed using a commercially available process simulation software, such as Arena® marketed by Rockwell Software of Sewickley, Pa. Alternatively, the security checkpoint data 321 and the security checkpoint demand data 331 may be used by a simulation program created using known programming techniques and known computer languages such as JAVA, Simscript, SLAMII, Extend, Promodel, etc.

Figure 5:
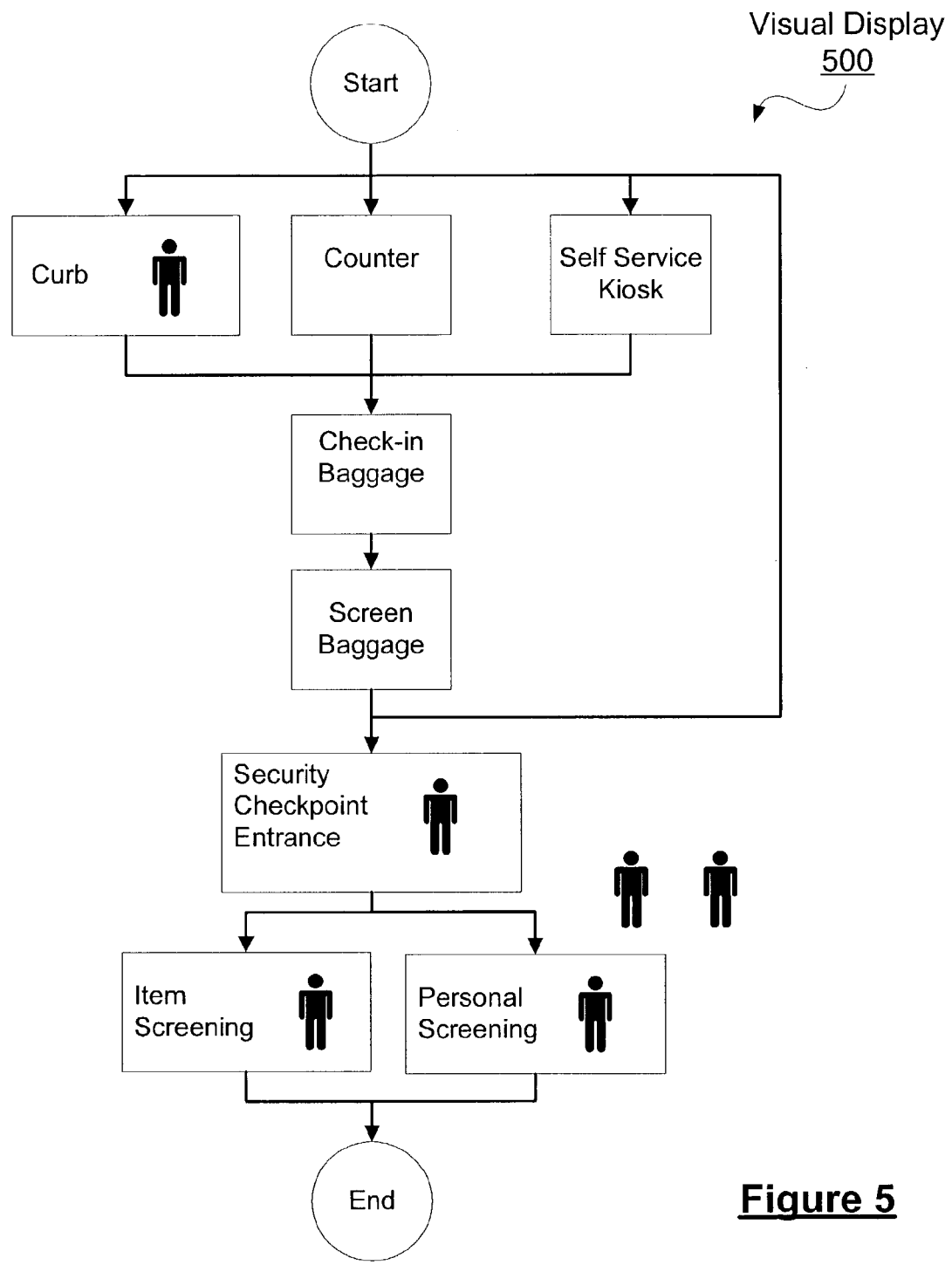
FIG. 5 is an exemplary display of the results of a security checkpoint simulation in accordance with an embodiment of the present invention.

Optionally, the results of the simulation from step 340 may be displayed as needed, step 350. For instance, the above-cited Arena® application has a feature that allows users to visually represent a simulation in which people and security tasks are graphically displayed. In this way, a user may see locations causing excessive delays and associated queue lengths. For example, FIG. 5 depicts an exemplary display 500 using the checkpoint model 200 adapted for an airport. In this way, the simulation may assist policy makers to visualize points in the security checkpoint that need to be expedited, e.g., through reconfiguration of checkpoint or through different equipment or employee deployment. The checkpoint simulation may then be repeated with different time delay values for the tasks in the security checkpoint to test the effectiveness of the changes.

The present invention therefore allows for data modeling & simulation by providing quantitative modeling support and analysis to develop fact-based recommendations for policy decisions. For example, the model 200 may be used to provide equipment requirements balanced against checkpoint demand and service level. Likewise, the model 200 may be used to simulate checkpoint staffing requirements such as a required number of wanders, bag searchers, etc. for various checkpoint configurations. The model 200 may also be used to simulate checkpoint equipment requirements, such a required number of X-Rays machines for various lane configurations. The model 200 may further be used to recommend checkpoint staffing for peak volume and non-peak operations. Similarly, the model may be used to assess (1) continuous (random) policy compliance levels for security devices; (2) the impact of alternative, gender based scanning policies; (3) the impact of eliminating or adding various screening steps in the security checkpoint; (4) the impact of check-in counter wait time on security checkpoint demand; or (5) the impact of reduced lane staffing on checkpoint operations.

The data modeling and simulation of the present invention is uniquely suited to provide analytical support for security checkpoint operations focusing on resources requirements (equipment & staffing), process performance, customer experience and cost. Specifically, the present invention provides analytical support for various Resource Requirements policies concerns such as: Employee work rules (impact of number of breaks, lunch, training etc.); reduced checkpoint staffing requirements (impacts of reduced staff on checkpoint operations); reduced airport staffing requirements (optimized scheduling of shared resources across airport); new staffing requirements based on process changes (i.e. checkpoint selectee screening); or annual labor planning based on seasonal demand (Workforce management on annual basis). By varying the values in the model 200, the present invention further provides analytic support for various checkpoint process change policies concerns such as: Process changes or re-designs (i.e. new security directives which change process steps or time); new technology inserted into the existing or redesigned process (i.e. new type of x-ray); or emergency response planning (concourse dumps, checkpoint shutdowns, etc.). The present invention may also provide analytic support for various customer experience policy concerns such as: alternative service level requirements (i.e. different service levels for non-peak operations); alternative queue management techniques (i.e. "show times" for passengers); or designated & dedicated lanes and lines (i.e. designated lanes for premium customers).

As described above, the number of people to be processed through the security checkpoint, i.e., the demand for the security checkpoint, may be measured empirically or may be estimated using passenger behavior and flight information. As depicted in graph 400 of FIG. 4A, an airport typically has one or more peak periods during the day corresponding with periods of high traffic. The depicted demand curve in graph 400 shows peak demands around 6 AM and 6 PM. By using demand that varies during the day to represent the actual passenger behavior, the simulation can more accurately reproduce the security delays. During peak periods, the queues for each of the security tasks tend to increase, thereby increasing the overall delay caused by the security tasks. Using this information, policy makers may decide to staff the security checkpoint as necessary to minimize the security delays during the peak period.

The number of passengers arriving at the security checkpoint may be divided into fixed minute time periods, such as 30-minute intervals. The average demand during each of the periods may then be displayed, as illustrated in graph 400' in FIG. 4B, as the horizontal line in each of the boxes. The overall number of passengers during the time period will be the area of the box, or the average demand multiplied by the time period.

FIG. 4C depicts an alternative security checkpoint demand curve 400" representing the demand for a security checkpoint at large public event beginning at 6 PM. In curve 400", increasing numbers of people arrive before the event begins, but the number of the people at the security checkpoint drops off rapidly after event begins.

The results of the security model may be displayed, as depicted display 500 of FIG. 5. Specifically, each passenger or groups of passengers may be graphically displayed along with a graphical representation of events or positions in the security checkpoint. Display 500 shows an instantaneous situation in which passengers are checking-in at the curb, entering the security checkpoint, in item screening, and in personal screening. Also, display 500 depicts two passengers waiting for a personal search.

Figure 6:
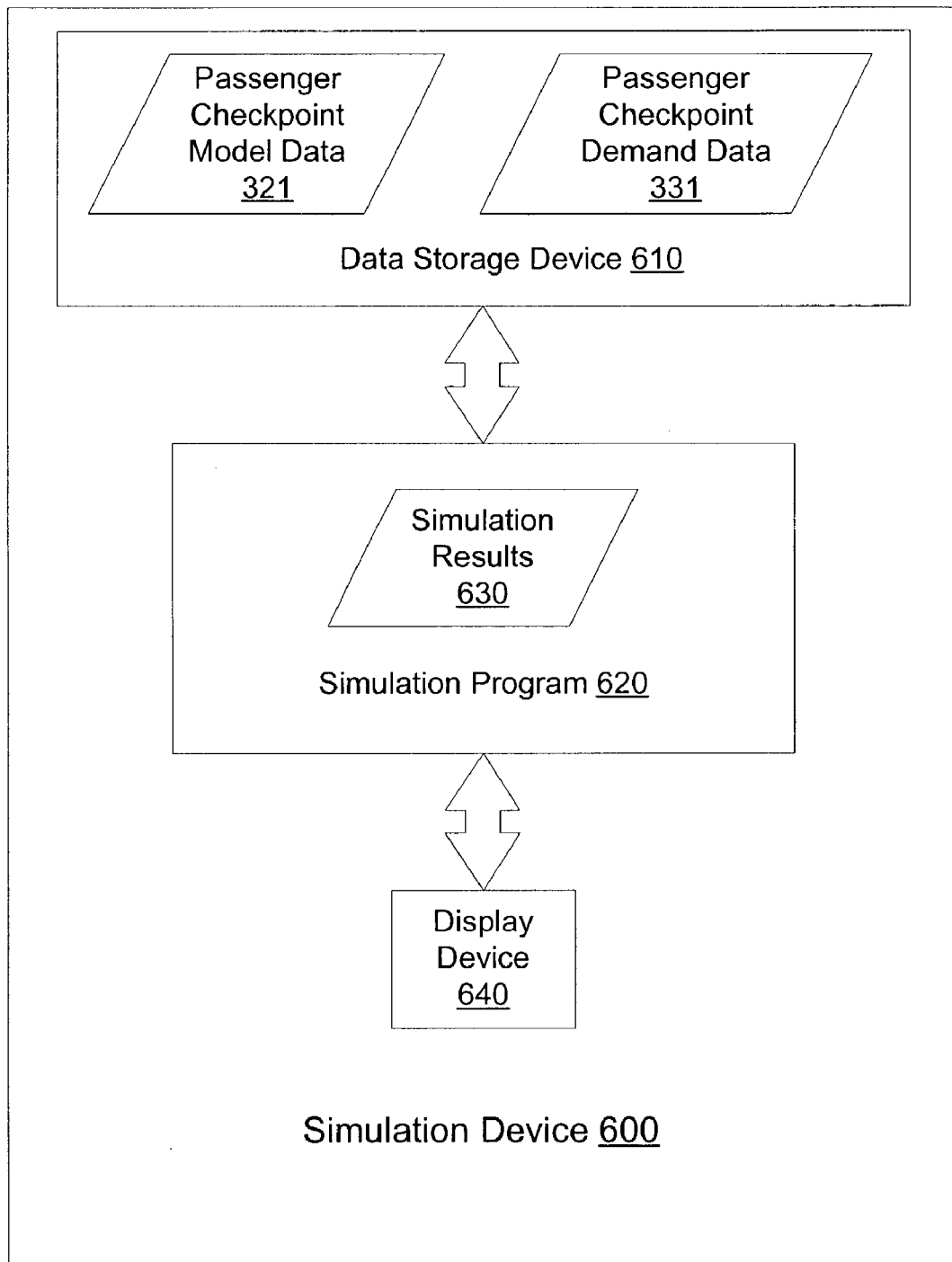
FIG. 6 is a schematic diagram of a system for implementing the security checkpoint simulation method of FIG. 3 in accordance with an embodiment of the present invention.

A system 600 for implementing the security checkpoint simulation method 300 is depicted in FIG. 6. The system 600 includes a known data storage device 610 containing the security checkpoint model data 321 and the security checkpoint demand data 331, as described above. The system 600 may further contain a known simulation program 620, such as the above described Arena® application. The simulation program 620 uses the security checkpoint model data 321 and the security checkpoint demand data 331 to run a simulation of the security checkpoint and to produce the simulation results 630. The simulation results 630 generally include the delay time encountered by each passenger at each of the locations in the security checkpoint. Using this data, the simulation program may display the security checkpoint simulation and the results on a known display device 640, as depicted in display 500 in FIG. 5.

EXAMPLES

Some examples of using the present invention to simulate changes in a security checkpoint model are now provided.

Example 1

Maintain Desired Service Levels

In one implementation, the system and method of the present invention may be used to evaluate the number of lanes or security devices needed at a security checkpoint to fulfill desired service levels. In this context, service levels relate to the experience of people passing through the security checkpoint, such as the total process time in the checkpoint or the length of the queue for the processes in the checkpoint. To represent a change in the number of lanes, a user may modify the process times for each of the processes in the security checkpoint. For instance, the maximum process times for each of the processes in checkpoint model 200 may be reduced to reflect an increased number of lanes. Likewise, the maximum process times may be increased to reflect a decrease in the number of lanes.

In the same way, a user may use the simulation to evaluate changes in the configuration of the security checkpoint. For example, if queue length is the service level measure of interest, a first simulation is run with the security checkpoint model reflecting the current checkpoint configuration. Then, the model may be adjusted to reflect changes in the security checkpoint. Again, the adjustment generally entails changes to the process times, as described above. A second simulation is run using the adjusted model. The output data (containing the queue lengths) from the two simulations may then be compared to discern the changes in customer experiences and queue lengths caused by the change in checkpoint configuration.

Example 2

Changes in Checkpoint Configuration

In another implementation, the system and method of the present invention may be used to evaluate changes in the checkpoint configuration, such as changes in machinery or personnel. To reflect changes in the machinery or personnel, the process times for processes in the security checkpoint may be adjusted, as described above. Returning to model 200, process times for the substeps of entering the checkpoint 210, screening items 220, and screening people 230 may be adjusted. For example, a new security device for inspecting shoes implemented in step 236 may evaluated by changing the process time for that step. Alternatively, if the personal scanning device used in step 231 is adapted to inspect shoes as well, a separate shoe inspection is unnecessary and the process time for the shoe inspection 236 may be set at zero. Then, a simulation may be repeated to determine the effect of the technology change. In the same fashion, the addition of a new screening test in the security checkpoint may be modeled through the addition a new process having a separately defined process time.

Example 3

Changes in Checkpoint Policy

In another implementation, the system and method of the present invention may be used to evaluate policy changes at the checkpoint. As previously described, changes in the sensitivity of a particular screening device may be modeled changes in the process times associated with that device. Where the policy change affects the relationships of the processes in the security checkpoint, the rules for linking these processes maybe amended. For instance, the processes may be reordered or reconnected as needed to reflect changes in the checkpoint.

Additionally, the present invention may be used to evaluate more complex policy changes. For instance, a rule restricting the flow of people through the security checkpoint based on queue length of one or more processes may be evaluated. Specifically, the checkpoint may prevent new people from being scanned in step 231 if an excessive queue (i.e., more than three people) forms for resolving personal scan alarms in step 234. In that instance, the queue to step 234 may physically prevent new people from entering the personal scan device. This type of rule may be modeled by having the personal scan of step 231 proceed only if the output of the alarm resolution in step 234 indicates that step 234 has a queue of three or less people. Continuing with the above-described situation, the model may be programmed to prevent simulated people from entering the security checkpoint in step 210 and from loading items in step 221 if step 234 has an excessive queue. Similarly, the model may be programmed to prevent new people from the personal scan in step 231 if the excessive queue (i.e., three or more people) forms to resolution of item screen alarms in step 225. In the same way, the initiation of any step may be delayed until the completion of another step.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A method for computer-based simulating of a security checkpoint, the method comprising:
    storing data representing the security checkpoint;
    creating a security checkpoint model using the stored data, wherein the creating the security checkpoint model comprises:
        modeling a security checkpoint entrance process,
        modeling a personal screen process, wherein the step of modeling the personal screen process comprises modeling a personal scan and modeling of one or more personal examinations that occur when the personal scan produces an alarm, and
        modeling an item screen process;
    creating simulation results by computer-based simulating of the security checkpoint using the security checkpoint model; and
    displaying said simulation results.

2. The method of claim 1 further comprising the step of defining a process time for each of the processes.

3. A method for computer-based simulating of a security checkpoint, the method comprising:
    storing data representing the security checkpoint;
    creating a security checkpoint model using the stored data, wherein the creating of security checkpoint model comprises:
        modeling a security checkpoint entrance process,
        modeling a personal screen process, and
        modeling an item screen process, wherein the step of modeling the item screen process comprises modeling an item scan and modeling of one or more additional item examinations that occur when the item scan produces an alarm, wherein the additional item examinations do not begin until completion of the personal screen process;
    creating simulation results by computer-based simulating of the security checkpoint using the security checkpoint model; and
    displaying said simulation results.

4. The method of claim 1, wherein the security checkpoint is in an airport.

5. The method of claim 4, wherein the modeling of the security checkpoint further comprises modeling a check-in process.

6. The method of claim 4, wherein the modeling of the security checkpoint further comprises modeling a check-in process.

7. A system for computer-based simulating of a security checkpoint, the system comprising
    a storage device for storing data, said data representing a security checkpoint model, wherein said security checkpoint model separately models a security checkpoint entrance process, a personal screen process, and an item screen process, wherein the personal screen process comprises a personal scan and one or more personal additional examinations that occur when the personal scan produces an alarm
    a simulation application that accesses said storage device to acquire said security checkpoint model and simulates said security checkpoint model to produce simulation results; and
    a display device that receives and displays said simulation results.

8. The system of claim 7, wherein the security checkpoint model further comprises a process time for each of the processes.

9. The method of claim 7, wherein the security checkpoint is in an airport.

10. The system of claim 9, wherein the security checkpoint model further models a check-in process.

11. A system for computer-based simulating of a security checkpoint, the system comprising
    a storage device for storing data, said data representing a security checkpoint model, wherein said security checkpoint model separately models a security checkpoint entrance process, a personal screen process, and an item screen process, wherein the item screen process comprises an item scan process and one or more additional item examinations that occur when the item scan produces an alarm wherein the additional item examinations do not begin until completion of the personal screen process;
    a simulation application that accesses said storage device to aquire said security checkpoint model and simulates the security checkpoint using said security checkpoint model to produce simulation results; and
    a display device that receives and displays said simulation results.

12. The system of claim 11, wherein the process for resolution of the item scan alarm models one or more item examinations.

13. The system of claim 7 further comprising a data storage device for storing output data from the simulation application, said output data corresponding to said security checkpoint model.

14. The system of claim 13 further comprising a display device for graphically displaying said output data.

15. The system of claim 13 further comprising an alternative security checkpoint model modifying one or more of said processes, and wherein said storage device further contains output data corresponding to a simulation of said alternative security checkpoint model.

16. The system of claim 7 further comprising a security checkpoint demand model, wherein the simulation application considers the security checkpoint demand model.

17. A method for evaluating a customer's experience in a security checkpoint, the method comprising:
　storing data representing the security checkpoint;
　developing a security checkpoint model using the stored data, wherein the security checkpoint model that embodies separate tasks associated with screening the customer and screening the customer's processions, wherein the tasks associated with screening the customer's possession comprise an item scan and one or more additional item examinations that occur when the item scan produces an alarm, and wherein the additional item examinations do not begin until completion of the personal screening;
　creating simulation results by computer-based simulating of the security checkpoint using the security checkpoint model, wherein simulation results measure the customer's experience; and
　displaying said simulation results.

18. The method of claim 17, wherein the simulation results comprise:
　time that the customer spends in the security checkpoint;
　time that the customer spends in one of the tasks in the security checkpoint;
　a probability that the customer is searched in one of the tasks in the security checkpoint;
　length of a queue in the security checkpoint; or
　length of a queue at one of the tasks in the security checkpoint.

19. The method of claim 17, wherein the tasks associated with the screening the customer comprise a personal scan and one or more additional personal examinations that occur when the personal scan produces an alarm.

* * * * *